(12) United States Patent
Nakajima et al.

(10) Patent No.: US 11,919,604 B2
(45) Date of Patent: Mar. 5, 2024

(54) LEANING VEHICLE

(71) Applicant: Kawasaki Motors, Ltd., Akashi (JP)

(72) Inventors: Takeshi Nakajima, Akashi (JP); Hiroshi Ishii, Akashi (JP); Taro Iwamoto, Akashi (JP); Kazuya Nagasaka, Akashi (JP); Taichi Inaba, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/757,970

(22) PCT Filed: Dec. 9, 2020

(86) PCT No.: PCT/JP2020/045866
§ 371 (c)(1),
(2) Date: Jun. 24, 2022

(87) PCT Pub. No.: WO2021/131706
PCT Pub. Date: Jul. 1, 2021

(65) Prior Publication Data
US 2023/0017574 A1 Jan. 19, 2023

(30) Foreign Application Priority Data

Dec. 26, 2019 (JP) ................. 2019-236738

(51) Int. Cl.
*B62K 5/10* (2013.01)
*B62K 5/027* (2013.01)
(Continued)

(52) U.S. Cl.
CPC .............. *B62K 5/10* (2013.01); *B62K 5/027* (2013.01); *B62K 5/05* (2013.01); *B62K 5/08* (2013.01)

(58) Field of Classification Search
CPC . B62K 5/10; B62K 5/027; B62K 5/05; B62K 5/08; B62L 1/00
See application file for complete search history.

(56) References Cited

U.S. PATENT DOCUMENTS 8,070,017 B2 * 12/2011 Green ................... B65D 83/38
222/402.1
8,070,172 B1 12/2011 Smith et al.
(Continued)

FOREIGN PATENT DOCUMENTS

CN 201670311 12/2010
CN 107600258 1/2018
(Continued)

*Primary Examiner* — Paul N Dickson
*Assistant Examiner* — Shams Dhanani
(74) *Attorney, Agent, or Firm* — Fay Kaplun & Marcin, LLP

(57) ABSTRACT

A leaning vehicle includes a vehicle body, a left front wheel, a right front wheel, a lean mechanism, and a lean brake mechanism. The lean mechanism causes the left front wheel and the right front wheel to lean about a front-rear direction as a rotation center when the vehicle body leans about the front-rear direction as a rotation center. The lean brake mechanism brakes a leaning operation of the lean mechanism. The lean brake mechanism includes a brake disc and brake pads. The brake disc is attached to an upper arm or a lower arm. The brake pads, which are attached such that their position relative to the brake disc changes in the leaning operation, produce a frictional force against the brake disc in the leaning operation.

11 Claims, 9 Drawing Sheets

(51) Int. Cl.
*B62K 5/05* (2013.01)
*B62K 5/08* (2006.01)

(56) References Cited

U.S. PATENT DOCUMENTS

| | | | |
|---|---|---|---|
| 9,216,790 B2* | 12/2015 | Takano | B62K 5/08 |
| 2015/0246704 A1 | 9/2015 | Takano et al. | |
| 2019/0009633 A1 | 1/2019 | Raffaelli | |
| 2019/0118598 A1 | 4/2019 | Sasaki | |
| 2023/0356799 A1* | 11/2023 | Bazak, Sr. | B62K 5/06 |

FOREIGN PATENT DOCUMENTS

| | | | |
|---|---|---|---|
| CN | 207360480 | 5/2018 | |
| ES | 1 086 231 | 7/2013 | |
| JP | 2003-535742 | 12/2003 | |
| JP | 2005313876 A * | 11/2005 | B60G 17/0152 |
| JP | 2003-535742 | 12/2011 | |
| JP | 5536965 | 5/2014 | |
| JP | 5536965 | 7/2014 | |
| JP | 2018-167678 | 11/2018 | |
| JP | 2019-503929 | 2/2019 | |
| JP | 2019-077368 | 5/2019 | |
| KR | 10-2011-0115287 | 10/2011 | |
| TW | M562251 | 6/2018 | |
| WO | 2019/060966 A1 | 4/2019 | |

* cited by examiner

LEANING VEHICLE

The present application is a 371 application of PCT Patent Application Serial No. PCT/JP2020/045866 filed on Dec. 9, 2020 which claims priority to Japanese Patent Application Serial No. 2019-236738 filed on Dec. 26, 2019. The disclosure of the above applications is incorporated herein by reference.

TECHNICAL FIELD

The present invention relates mainly to a leaning vehicle configured to lean a vehicle body when turning, for example.

BACKGROUND ART

Patent Literature 1 (PTL 1) discloses a three-wheeled vehicle including two front wheels and one rear wheel. The vehicle includes a tilt lock mechanism. The tilt lock mechanism is a mechanism for locking a leaning operation of a vehicle body to prevent a vehicle from leaning while the vehicle is stopped. The tilt lock mechanism is composed of a stop element and a lock caliper provided to a link mechanism for leaning the vehicle body. In response to a driver's manipulation, the lock caliper is operated to produce a frictional force between the stop element and the lock caliper, so that an operation of the link mechanism (that is, the leaning operation of the vehicle body) is locked.

CITATION LIST

Patent Literature
    PTL 1: Japanese Patent No. 5536965

SUMMARY OF INVENTION

A link mechanism for leaning a vehicle body tends to be large in size, and a configuration having a lean brake mechanism (tilt lock mechanism) provided to such a large link mechanism tends to suffer from an increased size of the lean brake mechanism, too. In a leaning vehicle having a link mechanism disposed between two front wheels for example, there is a limited space between the two front wheels. A configuration that allows the lean brake mechanism to be arranged with effective use of the space is demanded, therefore.

The present invention relates to a leaning vehicle having a lean brake mechanism arranged with effective use of a space between front wheels.
Solution to Problem The problem to be solved by the present invention is as above. The following describes solutions to the problem as well as advantageous effects thereof.

An aspect of the present invention provides a leaning vehicle having the following configuration. The leaning vehicle includes a vehicle body, a first front wheel, a second front wheel, a lean mechanism, and a lean brake mechanism. The first front wheel is positioned on a first side in a vehicle width direction. The second front wheel is positioned on a second side opposite to the first side in the vehicle width direction. The lean mechanism causes the first front wheel and the second front wheel to lean about a front-rear direction as a rotation center when the vehicle body leans about the front-rear direction as a rotation center. The lean brake mechanism brakes a leaning operation of the lean mechanism. The lean mechanism includes an upper arm, a lower arm, a first arm, and a second arm. The lower arm is positioned more downward than the upper arm. The first arm is attached to the first front wheel, and is rotatably attached to the upper and lower arms. The second arm is attached to the second front wheel, and is rotatably attached to the upper and lower arms. The lean brake mechanism includes a first brake member and a second brake member. The first brake member is attached to the upper arm or the lower arm. The second brake member is attached such that its position relative to the first brake member changes in the leaning operation, and produces a frictional force against the first brake member in the leaning operation.

Although a space between the two front wheels is limited because of the need to avoid interference of the front wheel with another member in steering or in the leaning operation, effective use of the narrow space can be made since the first brake member is attached to the upper arm or the lower arm.
Advantageous Effects of Invention One of advantages of the present invention is that a lean brake mechanism can be arranged with effective use of a space between front wheels.

DETAILED DESCRIPTION

Figure 1:
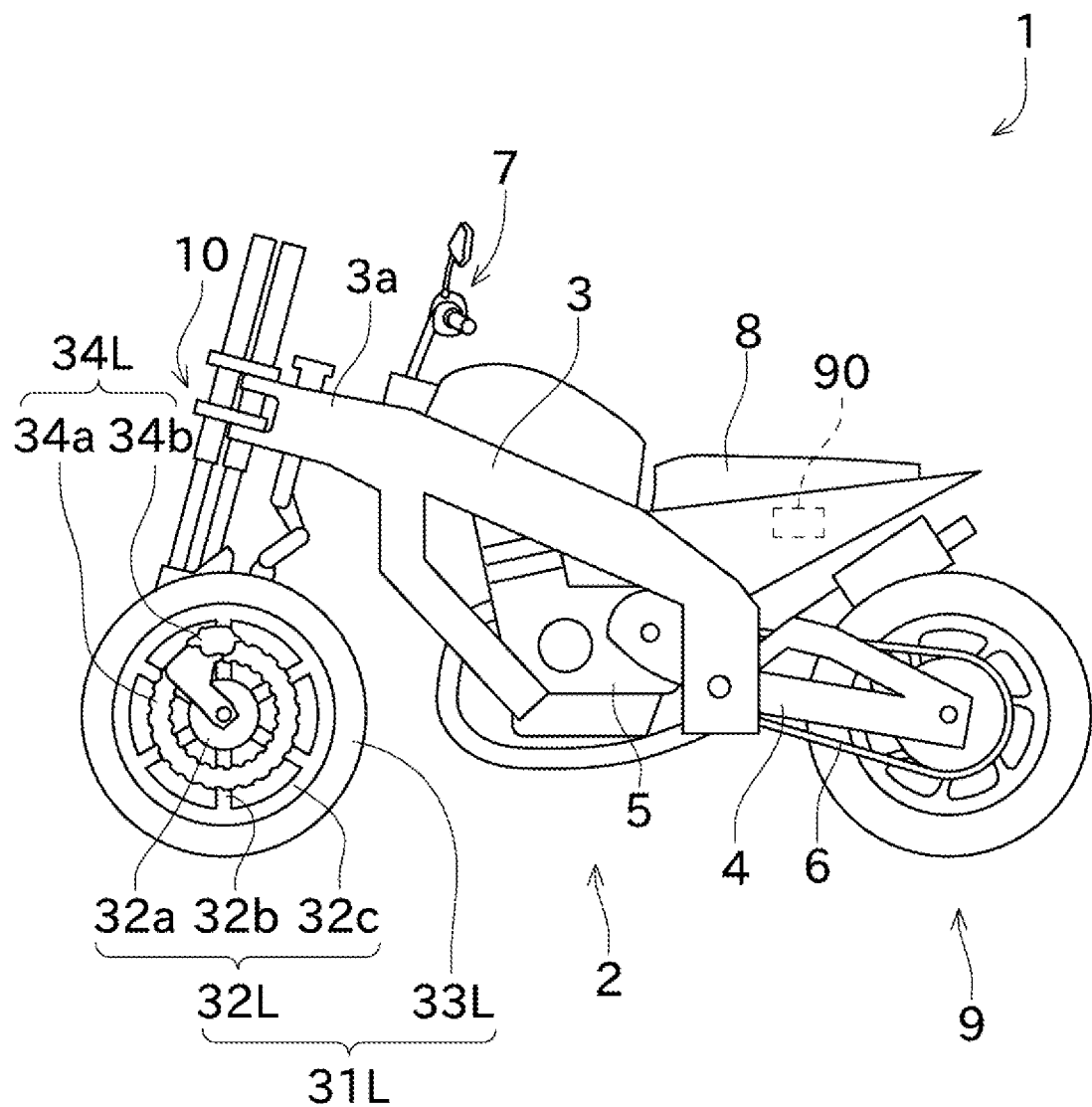
FIG. 1 shows a side view of a leaning vehicle according to a first embodiment of the present invention.

Hereinafter, embodiments of the present invention will be described with reference to the drawings. In the description below, a left-right direction of a leaning vehicle 1 is defined based on a direction in which a driver riding on the leaning vehicle 1 faces. While the leaning vehicle 1 is upright, therefore, a front-rear direction is coincident with a vehicle length direction, and the left-right direction is coincident with a vehicle width direction. An up-down direction or an upper-lower direction (vertical direction) is coincident with a height direction.

In the description below, the wording of A being attached to (supported by) B should be interpreted as showing not only a configuration in which A is directly attached to (supported by) B but also a configuration in which A is attached to (supported by) B with interposition of another member. The wording of A overlapping the center in the vehicle width direction means that an imaginary line passing through the center of the leaning vehicle in the vehicle width direction overlaps A in a plan view or a front view, for example. The term "front portion" means a frontmost portion from among two or three portions into which the whole is divided in the front-rear direction (the same applies to a rear portion, etc.). Any description about the position of a member is based on a state where the leaning vehicle 1 is upright, a state where a steering angle is neutral, and a state where no load is applied except the dead load.

First, referring to FIG. 1 and FIG. 2, outline of the leaning vehicle 1 will be described.

The leaning vehicle 1 includes a vehicle body 2, a left front wheel (first front wheel) 31L, a right front wheel (second front wheel) 31R, and a rear wheel 9. The vehicle body 2 includes a vehicle body frame 3, which constitutes a framework of the leaning vehicle 1. The vehicle body frame 3 is composed of two or more frame elements coupled with a bolt or by welding, for example.

The left front wheel 31L is disposed on the left side (first side) relative to the center in the vehicle width direction. The right front wheel 31R is disposed on the right side (second side) relative to the center in the vehicle width direction. The left front wheel 31L and the right front wheel 31R are attached to the vehicle body frame 3. Details of how the left front wheel 31L and the right front wheel 31R are attached will be given later.

The rear wheel 9 is disposed at the center in the vehicle width direction. A swing arm 4 attached to a rear portion of the vehicle body frame 3 is capable of swinging up and down relative to the vehicle body frame 3. The rear wheel 9 is attached to the swing arm 4.

An engine 5 is attached to the vehicle body frame 3. The engine 5 is a drive source for making the leaning vehicle 1 travel. Power generated by the engine 5 is transmitted to the rear wheel 9 via a drive chain 6. In this manner, the leaning vehicle 1 can be made travel. Instead of or in addition to the engine 5, another drive source such as an electric motor for traveling may be provided. Alternatively, the engine 5 may be replaced with, for example, a pedal that allows the driver to apply power for traveling.

Attached to the vehicle body frame 3 is a steering handle 7 in the shape of a handlebar. In response to the driver applying a rotational steering force to the steering handle 7, the rotational steering force is transmitted to the left front wheel 31L and the right front wheel 31R via a later-described mechanism and a steering rod 26. This can consequently change an advancing direction of the leaning vehicle 1. Hereinafter, a change of the advancing direction of the leaning vehicle 1 may sometimes be referred to as a turn of the leaning vehicle 1. The later-described lean mechanism causes the leaning vehicle 1, when turning, to lean toward the center of the turning relative to a road surface. The steering handle 7 is not limited to a handlebar type one, and may be a steering wheel.

A seat 8 for the driver to sit thereon is disposed rearward of the steering handle 7. Steps (not shown) are disposed on a left side surface and a right side surface of the vehicle body 2, respectively. The driver straddling the seat 8 places his/her feet on the left and right steps. The leaning vehicle 1 is a vehicle (straddle vehicle) of a type having the seat 8 on which the driver sits astride.

Figure 2:
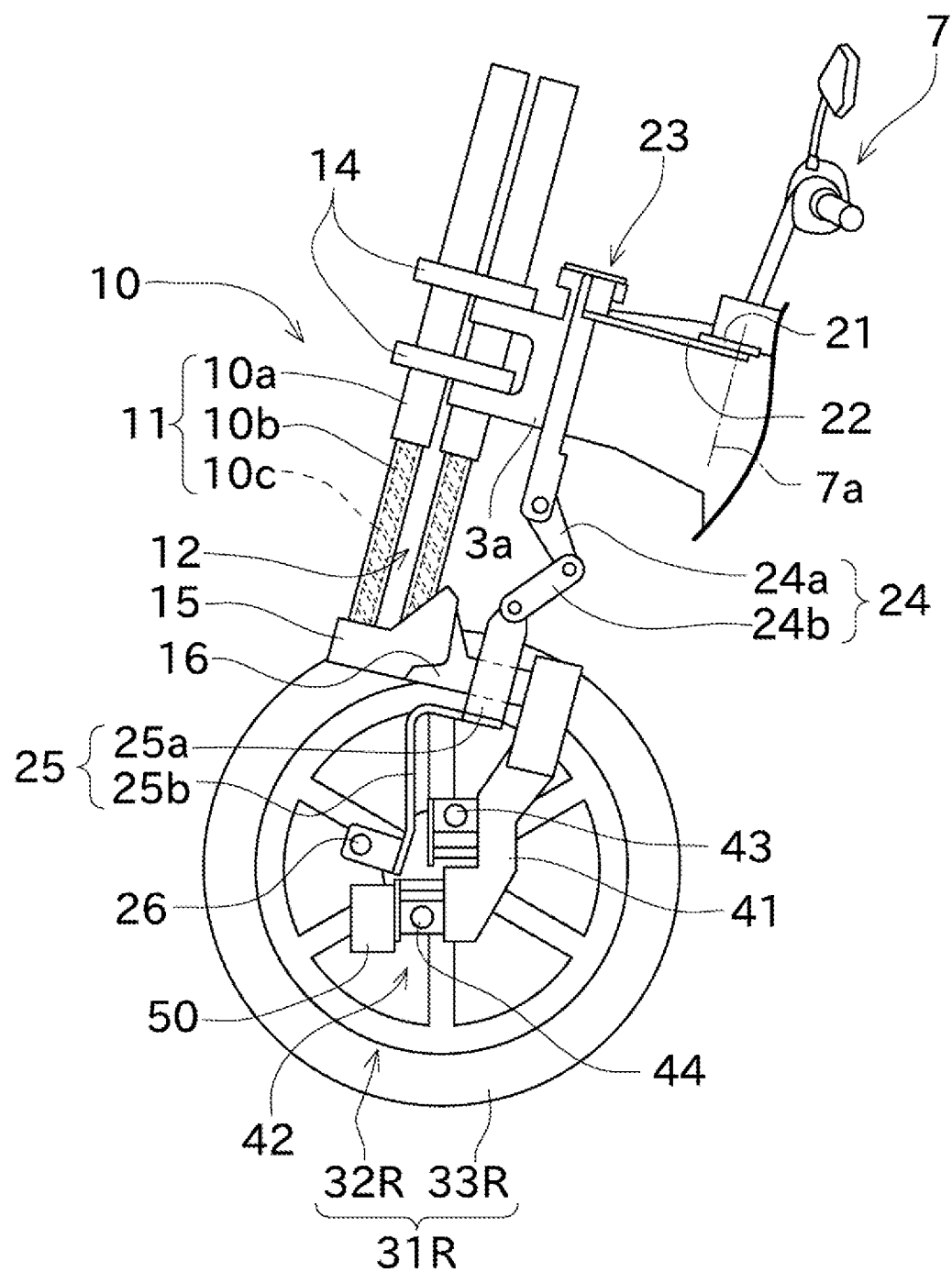
FIG. 2 shows a side view of a front portion of the leaning vehicle.
Figure 3:
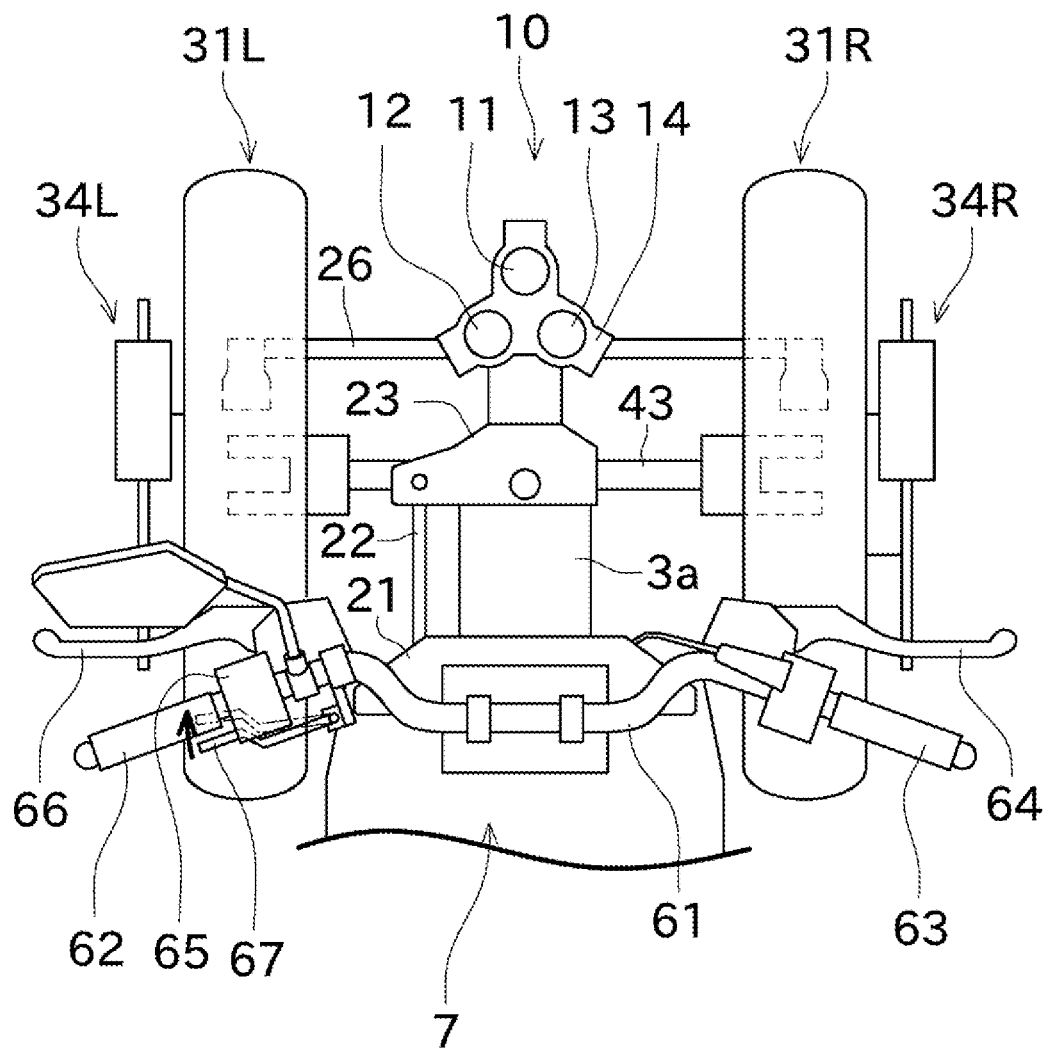
FIG. 3 shows a plan view of the front portion of the leaning vehicle.

A front suspension 10 included in the leaning vehicle 1 will now be described with reference to FIG. 2 and FIG. 3.

The suspension 10 couples the vehicle body 2 to the left front wheel 31L and the right front wheel 31R. The suspension 10 reduces vibrations that are transmitted to the vehicle body 2 in order that vibrations of the left front wheel 31L and the right front wheel 31R caused by, for example, unevenness of the road surface cannot be directly transmitted to the vehicle body 2. In the description below, a member attached on the side close to the left front wheel 31L and the right front wheel 31R (the side where vibrations occur) relative to the suspension 10 will be referred to as "vibration side member". A member attached on the side close to the vehicle body 2 (the side where vibration damping is made) relative to the suspension 10 will be referred to as "vibration-damping side member".

The suspension 10 includes a first tubular suspension 11, a second tubular suspension 12, and a third tubular suspension 13. In the following, the first tubular suspension 11, the second tubular suspension 12, and the third tubular suspension 13 will be collectively called "tubular suspensions 11, 12, and 13". The tubular suspensions 11, 12, and 13 have the same configuration. The configurations of the tubular suspensions 11, 12, and 13 are identical to the configuration of a front fork that is generally adopted in a motorcycle. The suspension 10 is not limited to a front fork type.

Each of the tubular suspensions 11, 12, and 13 includes a tubular body 10a, a sliding body 10b, and a spring 10c.

The tubular body (outer tube) 10a is an elongated tubular member. The tubular body 10a has the sliding body (inner tube) 10b received therein. The sliding body 10b is an elongated tubular member having a diameter smaller than that of the tubular body 10a. The sliding body 10b is capable of moving along its longitudinal direction relative to the tubular body 10a. The sliding body 10b has the spring 10c received therein. The tubular body 10a and the sliding body 10b are connected via the spring 10c. With this configuration, vibrations transmitted from the sliding body 10b to the tubular body 10a can be reduced. Oil is encapsulated in the suspension 10, and a movement of the sliding body 10b relative to the tubular body 10a causes a movement of the oil. The movement of the oil produces a resistance force (damping force), which can damp the vibrations in a short time.

In this embodiment, the tubular body 10a is disposed more upward than the sliding body 10b, and basically, the above-mentioned "vibration-damping side member" vibrates integrally with the tubular body 10a. The sliding body 10b is disposed more downward than the tubular body 10a. Basically, the above-mentioned "vibration side member" vibrates integrally with the sliding body 10b. Which one of the tubular body 10a and the sliding body 10b is disposed more upward or more downward than the other may be reversed.

The respective sliding bodies 10b of the tubular suspensions 11, 12, and 13 are configured to slide integrally. To be specific, the suspension 10 includes an upper coupling member 14 and a lower coupling member 15.

The upper coupling member 14 couples the respective tubular bodies 10a of the tubular suspensions 11, 12, and 13. This makes it impossible for the respective tubular bodies 10a of the tubular suspensions 11, 12, and 13 to move relative to one another, and thus the tubular bodies 10a can be integrated. At least one of the tubular bodies 10a of the tubular suspensions 11, 12, and 13 is attached to a front frame 3a disposed in a front portion of the vehicle body frame 3.

The lower coupling member 15 couples the respective sliding bodies 10b of the tubular suspensions 11, 12, and 13. This makes it impossible for the respective sliding bodies 10b of the tubular suspensions 11, 12, and 13 to move relative to one another, and thus allows the sliding bodies 10b to slide integrally. At least one of the sliding bodies 10b of the tubular suspensions 11, 12, and 13 is attached to a lower coupling base 16. The left front wheel 31L and the right front wheel 31R are attached to the lower coupling base 16 via the later-described mechanism.

Outline of the front wheel will now be described with reference to FIG. 1 and FIG. 2.

The left front wheel 31L and the right front wheel 31R are bilaterally symmetrical with respect to the center in the vehicle width direction. In the following, therefore, only the left front wheel 31L will be described, and a description about the right front wheel 31R (a right wheel 32R and a right tire 33R), a right brake 34R, and the like, will be omitted.

The left front wheel 31L includes a left wheel 32L and a left tire 33L. A left brake (front wheel brake mechanism) 34L is attached more outward than the left wheel 32L in the vehicle width direction. The left brake 34L applies braking to the left front wheel 31L by inserting a brake disc 34a, which is attached to the left wheel 32L, into a brake caliper 34b. It may be also acceptable that the left brake 34L is attached more inward than the left wheel 32L in the vehicle width direction.

The left wheel 32L includes a hub 32a, a spoke 32b, and a rim 32c. The hub 32a has a hub hole in which an axle is received. The spoke 32b is shaped to extend outward from the hub 32a in a radial manner. The rim 32c is connected to the radially outer side of the spoke 32b, and the left tire 33L is attached to the rim 32c.

Attached to the left wheel 32L is a left arm 45 as a left knuckle member. An outer end portion of the above-mentioned steering rod 26 in the vehicle width direction is rotatably attached to the left arm 45. The steering rod 26 transmits a steering force to the left front wheel 31L via the left arm 45. The left arm 45 also constitutes a part of a lean mechanism which will be described later. That is, the left arm 45 of this embodiment is a part in which a knuckle member for changing an actual steering angle and a member for leaning the leaning vehicle 1 are unified.

A mechanism for transmitting a rotational steering force applied by the driver will now be described with reference to FIG. 2 and FIG. 3.

Disposed below the steering handle 7 is a rear bracket 21. The steering handle 7 and the rear bracket 21 are coupled by a fixture, for example. The steering handle 7 and the rear bracket 21 are integrally rotatable about a steering rotation axis 7a (a line substantially parallel to the upper-lower direction). A rotation angle of the steering handle 7 about the steering rotation axis 7a may sometimes be referred to as maneuvering angle.

The rear end of a transmission arm (rotation transmission part) 22 is rotatably attached to the rear bracket 21. The transmission arm 22 connects the rear bracket 21 to a first steering part 23. The transmission arm 22 transmits a rotational steering force applied to the steering handle 7 to the first steering part 23.

The first steering part 23 is disposed more frontward than the rear bracket 21 and the steering handle 7. The first steering part 23 is disposed so as to overlap the center in the vehicle width direction. Attached to the first steering part 23 is the front end of the transmission arm 22. This configuration allows the first steering part 23 to rotate as the steering handle 7 and the rear bracket 21 rotate.

Attached to the first steering part 23 is a pantograph mechanism 24. The pantograph mechanism 24 is positioned so as to overlap the center in the vehicle width direction. The pantograph mechanism 24 includes a first link portion 24a and a second link portion 24b. The first link portion 24a is attached to the first steering part 23 so as to be rotatable about the vehicle width direction. The second link portion 24b is attached to a later-described second steering part 25 so as to be rotatable about the vehicle width direction. The second steering part 25 is a "vibration side member". The first link portion 24a and the second link portion 24b are coupled to each other so as to be rotatable about the vehicle width direction.

With the configuration described above, the first steering part 23 and the second steering part 25 can be kept coupled even if a relative distance between the first steering part 23 and the second steering part 25 is changed. Accordingly, transmission of the rotational steering force remains enabled even though the suspension 10 expands or contracts because of, for example, unevenness of the road surface.

The second steering part 25 is positioned so as to overlap the center in the vehicle width direction. The second steering part 25 transmits a rotational steering force received via the pantograph mechanism 24 to the steering rod 26. The second steering part 25 includes a suspension attaching portion 25a and a rod attaching portion 25b.

The suspension attaching portion 25a is attached to the pantograph mechanism 24 (more specifically, to the second link portion 24b). The suspension attaching portion 25a is attached to the lower coupling base 16, too. The second steering part 25 rotates in accordance with steering, while the lower coupling base 16 does not rotate in accordance with steering. Accordingly, the second steering part 25 is attached so as to be rotatable relative to the lower coupling base 16.

The rod attaching portion 25b is attached to a lower portion of the suspension attaching portion 25a. The rod attaching portion 25b has a substantially L-like shape including a portion that extends frontward from the suspension attaching portion 25a and a portion that extends downward. With this configuration, a space can be formed below the suspension attaching portion 25a. In this space, a part of the later-described lean mechanism is disposed.

The steering rod 26 is rotatably attached to the rod attaching portion 25b. The longitudinal direction of the steering rod 26 is coincident with the vehicle width direction. The left end of the steering rod 26 is attached to the left front wheel 31L (more specifically, to a portion of the left front wheel 31L more frontward than the axle). The right end of the steering rod 26 is attached to the right front wheel 31R (more specifically, to a portion of the right front wheel 31R more frontward than the axle). A rotational steering force applied by the driver causes the rod attaching portion 25b to rotate about a predetermined rotation axis, so that the steering rod 26 moves left or right. As a result, the actual steering angle is changed. The actual steering angle is a direction of the left front wheel 31L and the right front wheel 31R (more specifically, a rotation angle about a substantially upper-lower direction). This is how the advancing direction of the leaning vehicle 1 can be changed in accordance with the driver's manipulation.

Figure 4:
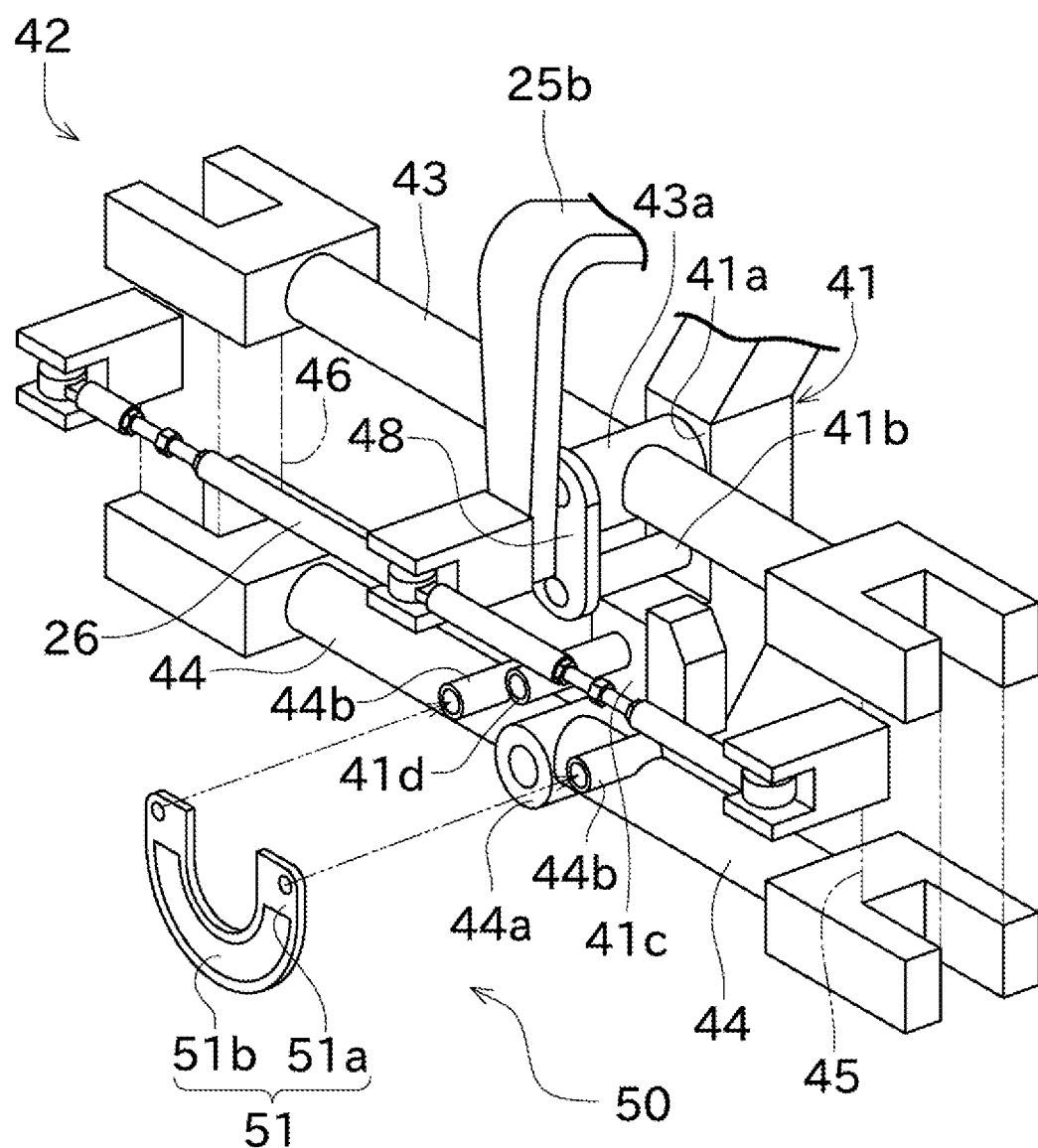
FIG. 4 shows a perspective view illustrating a brake disk being attached to a lean mechanism.
Figure 5:
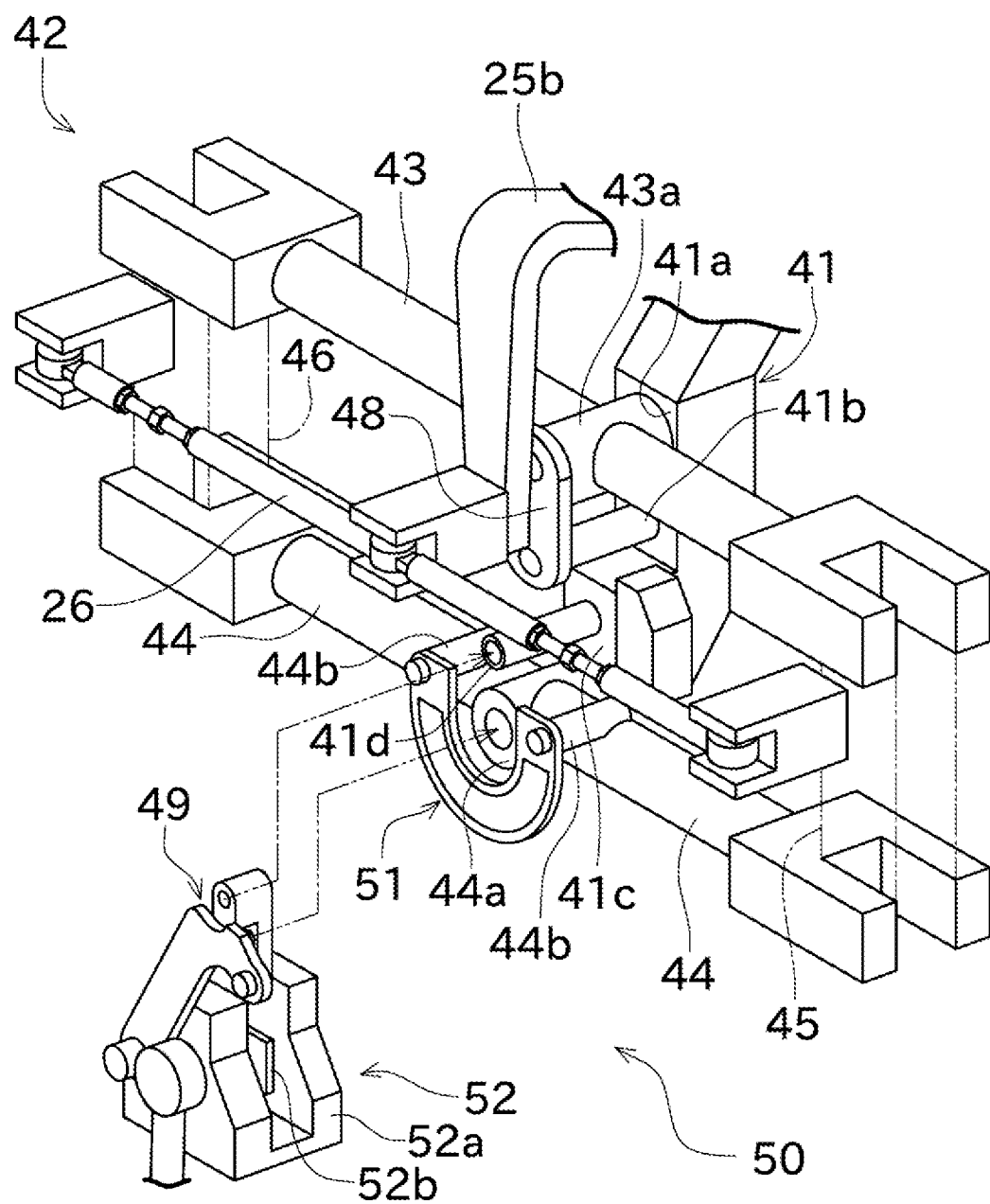
FIG. 5 shows a perspective view illustrating a brake caliper being attached to the lean mechanism.
Figure 6:
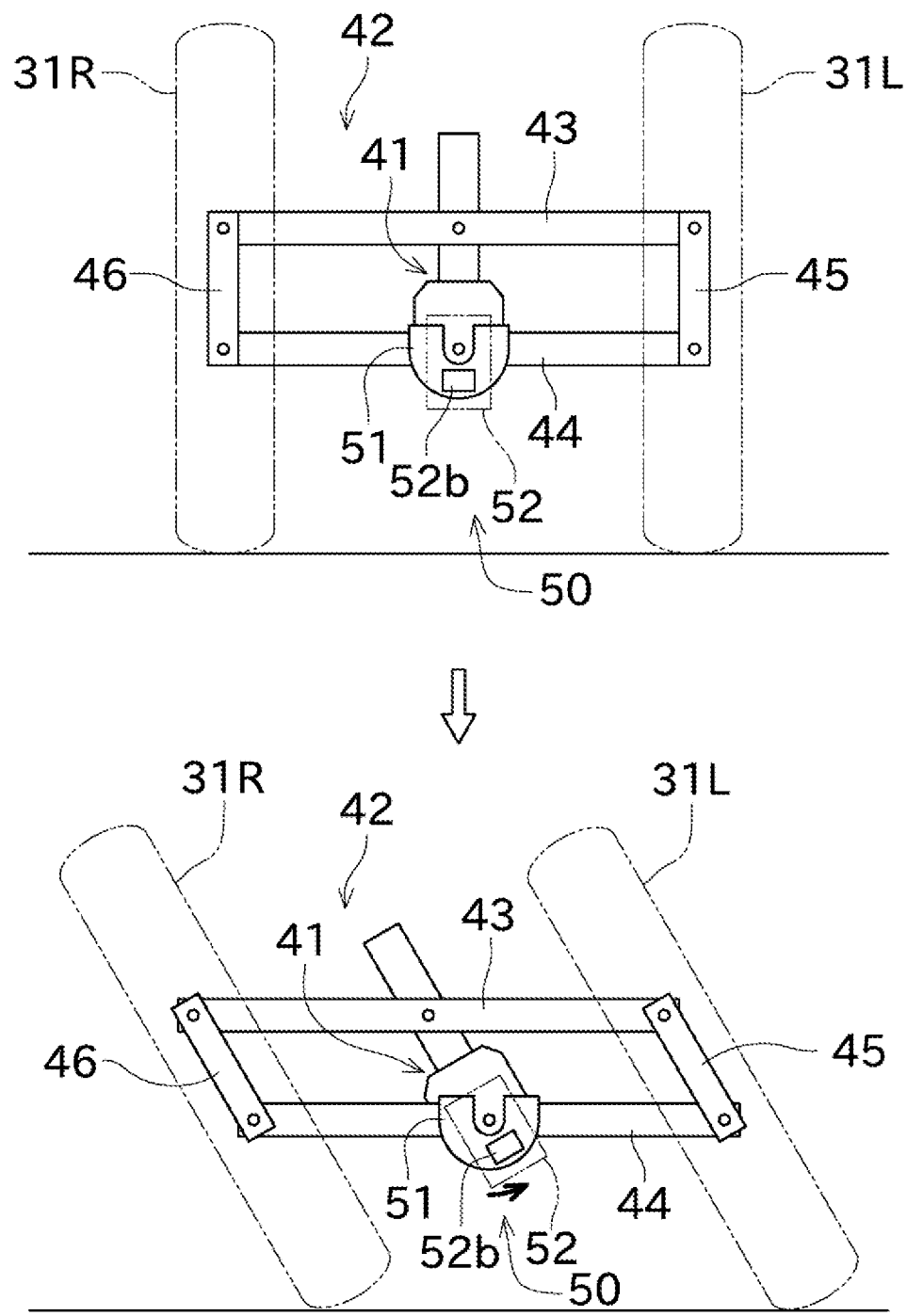
FIG. 6 shows a schematic front view illustrating a leaning operation and a leaning brake operation.

A lean mechanism 42 will now be described with reference to FIG. 4 to FIG. 6.

In the description of the lean mechanism 42, being rotatably attached means being attached so as to be capable of relative rotation about the front-rear direction.

Attached to a rear portion of the lower coupling base 16 is a lean base 41 extending downward from the lower coupling base 16. The lean base 41 is a member for supporting the lean mechanism 42 and also for coupling the lean mechanism 42 to the vehicle body 2 side (vehicle body frame 3 side). The lean base 41 is positioned so as to overlap the center in the vehicle width direction.

The lean base 41 and the lean mechanism 42, which are attached to the lower coupling base 16, are "vibration side members". The lean base 41 and the lean mechanism 42 are arranged at a relatively low position (a position where they are partially or entirely overlap the left front wheel 31L in a side view). With this, heavy parts can be arranged at a low position, and therefore the leaning vehicle 1 can be stabilized.

The lean base 41 includes an upper attaching portion 41a and a lower attaching portion 41c. The upper attaching portion 41a and the lower attaching portion 41c are formed on surfaces on the front side (one side in the front-rear direction, hereinafter the same). The upper attaching portion 41a is disposed more upward and more rearward than the lower attaching portion 41c. The upper attaching portion 41a has an upper protruding tube 41b protruding frontward. The lower attaching portion 41c has a lower protruding tube 41d protruding frontward. Here, it should be noted that the lean base 41 may have a configuration other than the first embodiment, as illustrated in a second embodiment which will be described later.

The lean mechanism 42 includes an upper arm 43, a lower arm 44, a left arm (first arm) 45, and a right arm (second arm) 46. The upper arm 43 is disposed more upward than the lower arm 44. The left arm 45 is rotatably coupled to the left end of the upper arm 43 and to the left end of the lower arm 44. The right arm 46 is rotatably coupled to the right end of the upper arm 43 and to the right end of the lower arm 44. The lean mechanism 42 is positioned so as to overlap the center in the vehicle width direction, and the left arm 45 and the right arm 46 are bilaterally symmetrical with respect to the center in the vehicle width direction.

The left end of the upper arm 43 has a bifurcated attaching portion. The upper arm 43 is attached to the left arm 45 in such a manner that the bifurcated attaching portion pinches an upper portion of the left arm 45 in the front-rear direction. This allows the left front wheel 31L to lean appropriately. The right end of the upper arm 43, and the left and right ends of the lower arm 44 also have bifurcated attaching portions in the same manner.

The upper arm 43 has, at its longitudinal center, an upper fulcrum portion 43a. The upper fulcrum portion 43a is a tubular portion whose axial direction is coincident with the front-rear direction. The upper fulcrum portion 43a is rotatably attached to the upper attaching portion 41a. The upper fulcrum portion 43a has the front end to which a coupling link 48 is rotatably attached. The coupling link 48 is rotatably attached not only to the front end of the upper fulcrum portion 43a but also to the front end of the upper protruding tube 41b. As a result, the upper arm 43 can be supported in a manner of being sandwiched between the lean base 41 and the coupling link 48 in the front-rear direction, so that the upper arm 43 can be supported more stably as compared to cantilevered supporting. The upper protruding tube 41b and the coupling link 48 may be omitted.

The lower arm 44 is attached in the same manner as the upper arm 43 is. To be specific, the lower arm 44 has, at its longitudinal center, a lower fulcrum portion 44a. The lower fulcrum portion 44a is a tubular portion whose axial direction is coincident with the front-rear direction. The lower fulcrum portion 44a is rotatably attached to the lower attaching portion 41c. The lower fulcrum portion 44a has the front end to which a lean bracket 49 is rotatably attached. The lean bracket 49 is rotatably attached not only to the front end of the lower fulcrum portion 44a but also to the front end of the lower protruding tube 41d. As a result, the lower arm 44 can be supported in a manner of being sandwiched between the lean base 41 and the lean bracket 49 in the front-rear direction, so that the lower arm 44 can be supported more stably as compared to cantilevered supporting.

The lean bracket 49 of this embodiment has a function for attaching not only the lower arm 44 but also another mechanism involved in leaning (e.g., a part of a lean brake mechanism 50) to the lean base 41. The lean brake mechanism 50 is a mechanism for braking a leaning operation. The lean brake means generating a resistance force on the leaning operation to make the leaning operation less likely to occur or to reduce the lean angle. The lean bracket 49 may be a member (a member like the coupling link 48) for attaching the lower arm 44 alone.

Both the upper protruding tube 41b and the lower protruding tube 41d are positioned more downward than the upper arm 43 and more upward than the lower arm 44. This allows the lean mechanism 42 to have a reduced size in the upper-lower direction as compared to a configuration having the upper protruding tube 41b disposed more upward than the upper attaching portion 41a, for example.

The left arm 45 is rotatably attached to the left wheel 32L. To be specific, the left arm 45 is attached to the hub 32a of the left wheel 32L. The left arm 45 is fixed to the left wheel 32L such that the left arm 45 leans integrally with the left wheel 32L. Likewise, the right arm 46 is fixed to the hub 32a of the right wheel 32R.

The four arms constitute a parallel link. Accordingly, even in the leaning operation, the upper arm 43 and the lower arm 44 are kept parallel as shown in FIG. 6. The upper arm 43 rotates about the upper fulcrum portion 43a relative to the lean base 41. Likewise, the lower arm 44 rotates about the lower fulcrum portion 44a relative to the lean base 41. This is how the lean mechanism 42 rotates relative to the lean base 41.

Since the four arms constitute the parallel link, the left arm 45 and the right arm 46 are kept parallel even in the leaning operation. It therefore is possible that the left front wheel 31L and the right front wheel 31R lean with the same lean angle. The lean angle means the angle formed between a vehicle height direction of the leaning vehicle 1 and a direction perpendicular to the road surface.

The lean base 41 couples the longitudinal center (upper fulcrum portion 43a) of the upper arm 43 to the longitudinal center (lower fulcrum portion 44a) of the lower arm 44. Accordingly, the lean base 41 leans with the same lean angle as the left front wheel 31L and the right front wheel 31R do. In other words, the vehicle body 2 leans with the same lean angle as the left front wheel 31L and the right front wheel 31R do. The rear wheel 9 leans integrally with the vehicle body 2. In this manner, the leaning vehicle 1 is configured to be capable of leaning.

Now, referring to FIG. 3, the steering handle 7 and operators disposed therearound will be described in detail.

The steering handle 7 includes a handlebar 61, a left grip (first grip) 62, and a throttle grip (second grip) 63. The handlebar 61 rotates in accordance with a rotational steering force applied by the driver. The handlebar 61, though it is a single bar in this embodiment, may composed of left and right separate bars. The left grip 62 is a part that the driver grips with his/her left hand. The throttle grip 63 is a part that the driver grips with his/her right hand. The driver can increase the rotation speed of the engine 5 by rotating the throttle grip 63.

Disposed near the throttle grip 63 is a brake lever 64 used to actuate the left brake 34L and the right brake 34R.

Disposed near the left grip 62 are a handle switch case 65, a clutch lever 66, and a lean brake manipulator 67.

The handle switch case 65 is positioned more inward than the left grip 62 in the vehicle width direction. The handle switch case 65 has an operator with which the driver gives various instructions to the leaning vehicle 1.

The clutch lever 66 is positioned more frontward than the left grip 62 in a plan view. The driver is capable of manipulating the clutch lever 66 without removing his/her hand from the left grip 62. The clutch lever 66 is a lever used to switch between a state where the engine 5 transmits power to the rear wheel 9 and a state where the engine 5 does not transmit power to the rear wheel 9.

The lean brake manipulator 67 is a lever used to actuate the later-described lean brake mechanism 50, mainly while the leaning vehicle 1 is traveling. Actuation of the lean brake can suppress occurrence of leaning of the leaning vehicle 1, and/or can reduce the lean angle.

The lean brake manipulator 67 is positioned left (the side opposite to the throttle grip 63) relative to the center in the vehicle width direction. The lean brake manipulator 67 is attached to the handlebar 61, and therefore rotates integrally with the handlebar 61, the left grip 62, and the like. The lean brake manipulator 67 is an operator that the driver manipulates with his/her thumb while gripping the left grip 62. The lean brake manipulator 67, therefore, is positioned more downward than the left grip 62, for example. The lean brake manipulator 67 is positioned closer to the center in the vehicle width direction than the longitudinal center of the left grip 62 is. With this configuration, the lean brake manipulator 67 is arranged at a position that allows the driver to easily manipulate the lean brake manipulator 67 with his/her thumb.

The lean brake manipulator 67, when manipulated by the driver, is thrusted forward with the driver's thumb. More specifically, the lean brake manipulator 67 is configured such that its position is changeable between a standby position (position illustrated with the solid line in FIG. 3) and an operating position (position illustrated with the dot and dash line in FIG. 3). Accordingly, a manipulated direction (pressed direction) of the lean brake manipulator 67 can be coincident with a direction in which a manipulation with the driver's thumb can be made easy.

While the leaning vehicle 1 is traveling, the driver finely adjusts the rotation angle of the throttle grip 63. If the lean brake manipulator 67 was disposed near the throttle grip 63, therefore, the driver needs to manipulate the lean brake manipulator 67 carefully, or otherwise the rotation angle of the throttle grip 63 may be changed accidentally. This embodiment, however, has the lean brake manipulator 67 positioned near the left grip 62, which is on the side opposite to the throttle grip 63, and therefore a driver's throttle operation is not interrupted.

The lean brake manipulator 67 is positioned on the side opposite to the brake lever 64 relative to the center in the vehicle width direction. Thus, a manipulation for actuating the braking to the left and right front wheel 31L, 31R is distributed to one of left and right, while a manipulation for actuating the lean brake is distributed to the other. This can make the manipulations simple for the driver.

The lean brake manipulator 67 may possibly be manipulated in low-speed traveling for the purpose of preventing the leaning vehicle 1 from leaning in the low-speed traveling, for example. In low-speed traveling, it is less easy to stabilize the attitude of the leaning vehicle 1, and therefore the driver tends to firmly hold the left and right grips. The lean brake manipulator 67 is suitable for a manipulation in low-speed traveling, because manipulating the lean brake manipulator 67 while gripping the left grip 62 is possible.

The lean brake manipulator 67 may possibly be manipulated before a turn is started, for the purpose of reducing the lean angle in turning, for example. Before a turn is started, the driver is often too occupied in watching forward to check his/her hands. This embodiment, however, has the lean brake manipulator 67 disposed at a position independent of the handle switch case 65. In other words, near the lean brake manipulator 67, no other operator is positioned. Accordingly, the driver can manipulate the lean brake manipulator 67 without the need to check his/her hands.

The layout of the lean brake manipulator 67 is merely an example. For instance, the lean brake manipulator 67 may be provided to the handle switch case 65. In a vehicle that requires no clutch operation or in a vehicle that has a clutch operator separately disposed, the lean brake manipulator 67 may be provided at a position corresponding to the clutch lever 66 of this embodiment. The lean brake manipulator 67 may be provided near the step such that the driver can manipulate the lean brake manipulator 67 with his/her foot.

The lean brake mechanism 50 will now be described with reference to FIG. 4 to FIG. 6.

The lean brake mechanism 50 actuates the lean brake by using a phenomenon in which the relative positions between the lean base 41 and the lower arm 44 changes along with the leaning operation. The lean brake mechanism 50 includes a brake disc (first brake member) 51 and a brake caliper (second brake member) 52.

The brake disc 51 is attached to the lower arm 44. More specifically, two tubular disc attaching portions 44b, to which fixtures can be fastened, are connected to the lower arm 44 by welding, etc. The two disc attaching portions 44b are bilaterally symmetrical with respect to the center in the vehicle width direction. Two attaching holes of the brake disc 51 are aligned respectively with the two disc attaching portions 44b, and fixtures are fastened, so that the brake disc 51 is attached to the lower arm 44. The brake disc 51, which is fixed in this manner, moves integrally with the lower arm 44.

The brake disc 51 is positioned so as to overlap the center in the vehicle width direction. As described above, the lower arm 44 is attached to the lean base 41, which also overlaps the center in the vehicle width direction. That is, the position at which the brake disc 51 is attached to the lower arm 44 is close to the position at which the lower arm 44 is attached to the lean base 41. More specifically, the lower fulcrum portion 44a for attaching the lower arm 44 to the lean base 41 is formed between the two disc attaching portions 44b. The brake disc 51 has a semicircular shape with its central portion cut out. From the cut-out portion of the brake disc 51, the lower fulcrum portion 44a is exposed. In this manner, the two members can be efficiently attached in a narrow space.

The brake disc 51 is attached to the lower arm 44 in such a direction that the brake disc 51 protrudes frontward and downward from the lower arm 44. In other words, the upper end of the brake disc 51 is attached to the front end of the lower arm 44. Accordingly, the lean mechanism 42, the steering rod 26, and the like, are less likely to interfere with the brake disc 51 (or the brake caliper 52 located therearound). Especially in this embodiment, the steering rod 26 is positioned above the brake disc 51 (they overlap each other in a plan view). Therefore, the brake disc 51 being attached so as to protrude downward can prevent interference especially between the brake disc 51 and the steering rod 26.

The brake disc 51 includes a base member 51a and rubber sheets (contact member) 51b. The base member 51a is made of a metal, and has a higher rigidity than the rubber sheets 51b. The rubber sheets 51b are stuck to opposite surfaces of the base member 51a. The rubber sheets 51b are made of a rubber, and have a flexibility. The rubber sheets 51b are basically apt to have a higher coefficient of friction than the base member 51a, though it depends on environments and a material of a part with which the rubber sheets 51 are contacted. This configuration can provide both a high rigidity and a high coefficient of friction. The materials of the base member 51a and the rubber sheets 51b are just examples, and may be other materials as long as the above-described characteristics are obtained. The rubber sheets 51b may be omitted.

The brake caliper 52 is positioned so as to overlap the center in the vehicle width direction. The brake caliper 52 includes a caliper body 52a and brake pads 52b.

The caliper body 52a is rotatably attached to the lower protruding tube 41d and the lower fulcrum portion 44a via the lean bracket 49. As mentioned above, the lean bracket 49 also has a function for coupling the lower arm 44 to the lower protruding tube 41d. In this manner, the lean bracket 49 is given the two functions, and the two members are attached via the lower protruding tube 41d, which can contribute to a reduced number of parts and a simplified configuration.

The caliper body 52a has a groove-shaped clamp portion, and the brake disc 51 is partially positioned in the clamp portion. The brake pads 52b are stuck to respective side walls that define the clamp portion. Connected to the brake caliper 52 is a brake hose. As the driver manipulates the lean brake manipulator 67, a hydraulic fluid is supplied to the brake caliper 52.

As a result, the clamp portion is closed, so that the brake pads 52b are pressed against the brake disc 51. Accordingly, the lean brake is actuated. The lean brake mechanism 50 may be of an electric-powered type or a wire type, instead of a hydraulic type.

Now, referring to FIG. 6, movements of the brake disc 51 and the brake caliper 52 in the leaning operation will be described. The brake disc 51, which is attached to the lower arm 44 against relative rotation, moves integrally with the lower arm 44. The lower arm 44 is capable of rotating relative to the lean base 41. Accordingly, in the leaning operation, the brake disc 51 rotates (about the lower fulcrum portion 44a) relative to the lean base 41.

The brake caliper 52, on the other hand, is attached at two points to the lean base 41 via the lean bracket 49. In the leaning operation, therefore, the brake caliper 52 does not rotate relative to the lean base 41.

In this embodiment, the brake disc 51 and the brake caliper 52 rotate relative to each other about the lower fulcrum portion 44a in the leaning operation. Thus, a frictional force produced by the brake pads 52b being pressed against the brake disc 51 as a result of actuation of the lean brake serves as a braking force (resistance force) on the leaning operation. In this manner, the lean brake mechanism 50 generates a braking force on the leaning operation.

In the leaning operation, the rotation angle of the brake disc 51 relative to the brake caliper 52 is equal to or less than 90 degrees. The lean brake mechanism 50 cannot be so large in size, because of the need to prevent interference with other parts. This is why a distance over which the brake disc 51 moves relative to the brake caliper 52 in the leaning operation is short. Thus, a frictional force increased by the rubber sheets 51b stuck to the base member 51a can provide a high braking force. The coefficient of friction (the coefficient of static friction or the coefficient of dynamic friction) caused by contact between the brake disc 51 and the brake pads 52b is higher than a coefficient of friction between the brake disc 34a and the brake caliper 34b for braking the left front wheel 31L.

To increase the distance over which the brake disc 51 moves relative to the brake caliper 52, the following configuration may be adopted. The brake disc 51 is attached to the lower arm 44. The brake disc 51 has a size that overlaps the upper arm 43 in a front view. The brake caliper 52 is attached to the upper fulcrum portion 43a. This can increase the radius of the relative rotation, and therefore can increase the distance of the relative movement.

Since the brake disc 51 and the brake caliper 52 rotate relative to each other, the semicircular shape of the brake disc 51 can be a minimum shape required of the brake disc 51. In addition, the lean brake mechanism 50 can be made smaller as compared to a configuration in which the relative movement between the brake disc 51 and the brake caliper 52 is linear or nearly linear.

The configuration of the lean brake mechanism 50 according to this embodiment is just an example. For instance, when a member, in addition to the lean base 41, that rotates relative to the lower arm 44 is present in the surroundings, the brake caliper 52 may be attached to the member. Instead of the configuration of this embodiment, a configuration may be adoptable in which the brake disc 51 is attached to the lean base 41 so as not to rotate relative to the lean base 41, while the brake caliper 52 is attached to the lower arm 44 so as to rotate relative to the lean base 41.

The brake disc 51 may be attached not to the lower arm 44 but to the upper arm 43. In a case of the brake disc 51 attached to the upper arm 43, occurrence of interference between the lean brake mechanism 50 and the lean mechanism 42, etc. can be reduced if the brake disc 51 is attached so as to protrude above the upper arm 43. Moreover, the position of the lean brake mechanism 50 is raised, and therefore the minimum ground clearance can be increased, or the lean brake mechanism 50 can be protected from water splash, stones, etc. coming from the road surface. In a case where, for example, the steering rod 26 is positioned more rearward than the lean mechanism 42, the brake disc 51 may be attached so as to protrude rearward from the upper arm 43 or the lower arm 44. This allows peripheral members of the lean mechanism 42 to be arranged collectively.

In this embodiment, the brake disc 51 is provided with the rubber sheets 51b. Instead of or in addition to this configuration, the brake pads 52b may be provided with rubber sheets. Alternatively, the brake pads 52b may be entirely made of a rubber. To obtain a high coefficient of friction, at least one of the brake disc 51 or the brake pads 52b may be processed so as to have a high surface roughness.

Next, how the lean brake is actuated in accordance with a manipulation on the lean brake manipulator 67 will be described.

In the following, three operation modes of the lean brake mechanism 50 in accordance with a manipulation on the lean brake manipulator 67 will be described. The leaning vehicle 1 may be configured to be capable of performing only one of the three operation modes, or may be configured to be capable of switching which operation mode is to be performed.

In a first operation mode, a braking force of the lean brake continuously changes in accordance with a manipulation on the lean brake manipulator 67. Specifically, the driver manipulates the lean brake manipulator 67, so that the lever position (attitude) is changed. As the change of the lever position of the lean brake manipulator 67 increases, a force with which the brake caliper 52 presses the caliper body 52*a* against the brake disc 51 increases (the braking force increases).

Thus, the driver can actuate the lean brake with any braking force in accordance with a situation, etc. In a case of performing the first operation mode, it is preferable that the lean brake manipulator 67 is of auto-return type. The auto-return type has a configuration in which the lever position of the lean brake manipulator 67 changes from the standby position to the operating position only while a manipulating force is applied, and once the manipulating force is lifted, a biasing force or the like is actuated so that the lever position automatically returns to the standby position.

In a second operation mode, whether or not the lean brake is actuated is switched in accordance with a manipulation on the lean brake manipulator 67. Specifically, the lever position of the lean brake manipulator 67 is configured to be switchable between a first position (effective state) and a second position (ineffective state). While the lever position of the lean brake manipulator 67 is in the first position, the lean brake is actuated with a predetermined braking force. While the lever position of the lean brake manipulator 67 is in the second position, the lean brake is not actuated.

The predetermined braking force may be preset. This makes it possible to reduce the lean angle at a time of turning if the lean brake manipulator 67 is brought into the first position only in a case of turning, for example. The braking force may be discretely chaneable in multiple stages.

In a case of performing the second operation mode, the lean brake manipulator 67 is preferably of switch type. The switch type is a type configured to keep the lever position as it is even after a manipulating force from the driver is lifted. The lean brake manipulator 67 of switch type may be configured such that the lean brake stays actuated even while the engine 5 is stopped. This can prevent the leaning vehicle 1 from leaning while stopped.

In the third operation mode, an automatic lean brake function is effected by a manipulation on the lean brake manipulator 67, and in this state, in response to satisfaction of an occurrence condition, a control device 90 shown in FIG. 1 transmits a hydraulic fluid or an electrical signal to the brake caliper 52 to actuate the lean brake. The occurrence condition is preferably that the vehicle speed be equal to or less than a threshold, or that the lean angle be equal to or more than a threshold, for example. The control device 90, which has an arithmetic logic unit such as a CPU and a storage device such as a flash memory, is capable of the control by the arithmetic logic unit executing a program. The control device 90 may be an engine control unit, or may be another control device.

Figure 7:
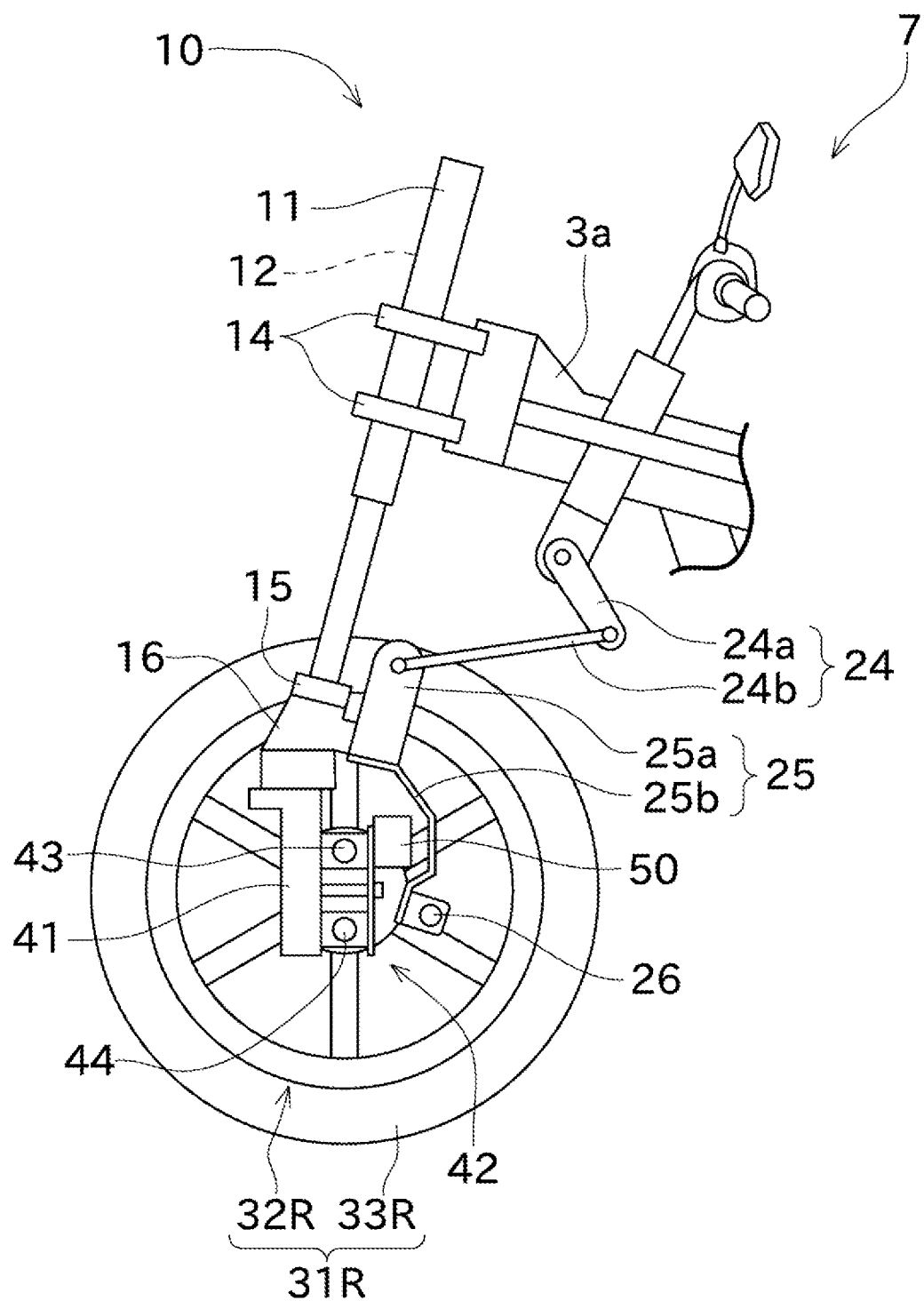
FIG. 7 shows a side view of a front portion of a leaning vehicle according to a second embodiment.

A leaning vehicle 1 according to the second embodiment will now be described with reference to FIG. 7 to FIG. 9.

The description of the second embodiment will mainly deal with configurations different from the first embodiment. In the description of the second embodiment, members identical or similar to those of the first embodiment are given the same reference signs on the drawings, and their descriptions may be omitted or simplified.

The suspension 10 of the first embodiment includes the three tubular suspensions 11, 12, and 13. A suspension 10 of the second embodiment, on the other hand, includes two tubular suspensions 11 and 12. The first tubular suspension 11 and the second tubular suspension 12 are disposed side by side in the vehicle width direction.

In the first embodiment, the rotational steering force of the steering handle 7 is transmitted to the pantograph mechanism 24 via the first steering part 23. In the second embodiment, on the other hand, a rotational steering force of a steering handle 7 is directly transmitted to a pantograph mechanism 24. Thus, the pantograph mechanism 24 is attached to a member that rotates coaxially with the steering handle 7.

In the second embodiment, a lower coupling base 16 does not cross a second steering part 25, and a lean base 41 is positioned immediately below the lower coupling base 16. An upper arm 43 and a lower arm 44 are positioned more rearward than the lean base 41. With this, a steering rod 26 and a lean brake mechanism 50 are also positioned more rearward than the lean base 41. In this manner, arranging members involved in leaning and steering on one side (on the front side in the first embodiment, and on the rear side in the second embodiment) of the lean base 41 allows the members involved in leaning and steering to be arranged collectively.

Figure 8:
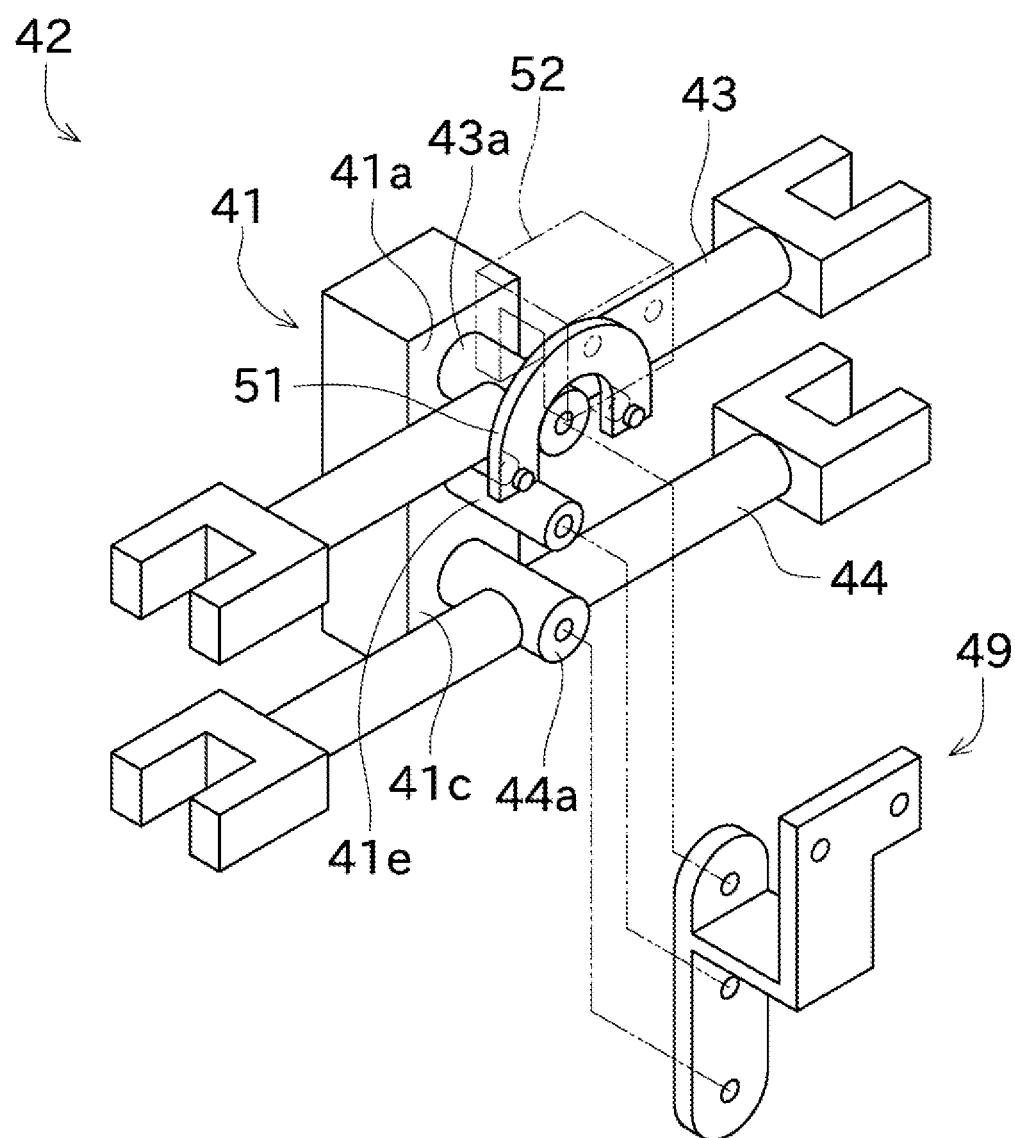
FIG. 8 shows a perspective view of a lean mechanism according to the second embodiment
Figure 9:
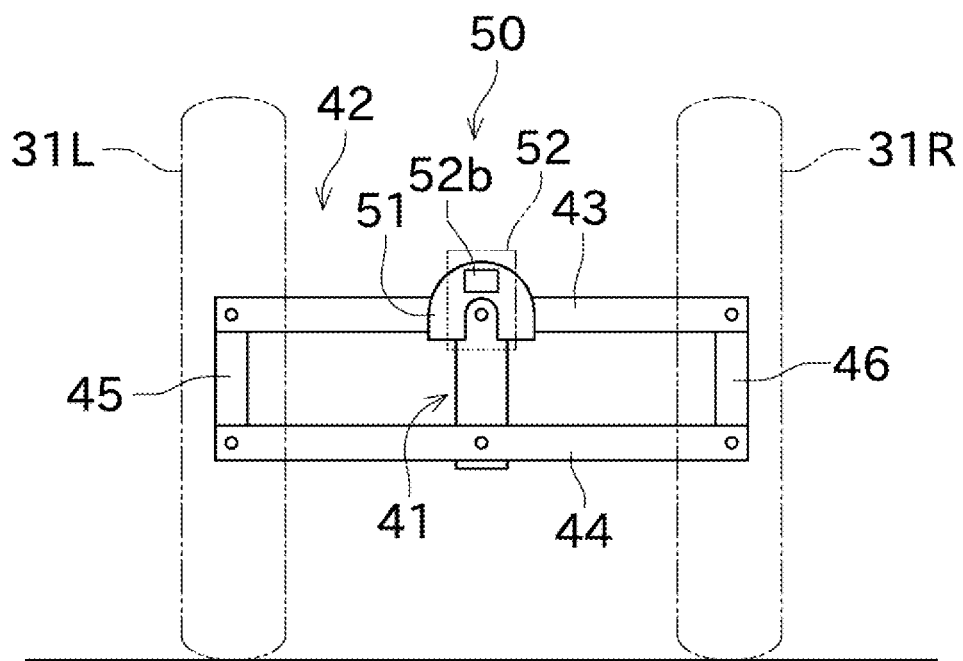
FIG. 9 shows a schematic rear view illustrating a leaning brake operation according to the second embodiment.
Figure 9:
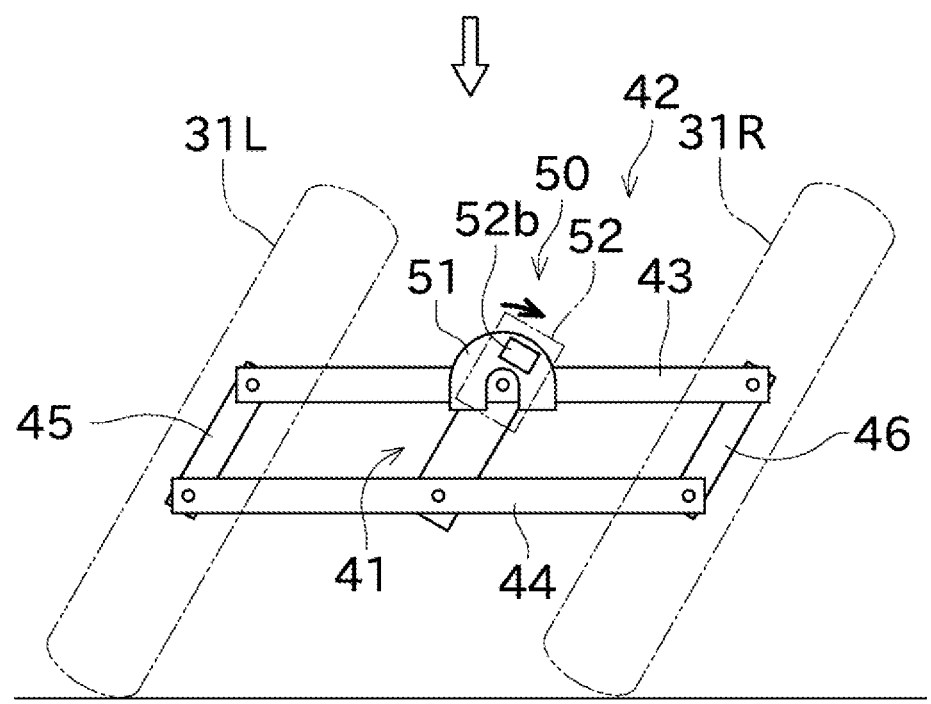

As shown in FIG. 8, a structure for attaching the upper arm 43 and the lower arm 44 is also different from that of the first embodiment. In the first embodiment, the upper attaching portion 41*a* and the lower attaching portion 41*c* of the lean base 41 are at different positions in the front-rear direction. In the second embodiment, an upper attaching portion 41*a* and a lower attaching portion 41*c* are at the same position in the front-rear direction. Accordingly, the upper arm 43 and the lower arm 44 are at the same position in the front-rear direction.

Although in the first embodiment, the lean base 41 has the upper protruding tube 41*b* and the lower protruding tube 41*d*, both of their functions is provided by a middle protruding tube 41*e* in the second embodiment. Thus, a lean bracket 49 attaches an upper fulcrum portion 43*a*, the middle protruding tube 41*e*, a lower fulcrum portion 44*a*, and the lean brake mechanism 50 collectively to the lean base 41.

In the first embodiment, the lean brake mechanism 50 is positioned near the lower arm 44, while in the second embodiment, the lean brake mechanism 50 is positioned near the upper arm 43. More specifically, the upper arm 43 has two disc attaching portions 44*b* with the upper fulcrum portion 43*a* interposed therebetween in the left-right direction. A brake disc 51 is attached to the disc attaching portions 44*b*. The brake disc 51 is attached so as to protrude above the upper arm 43. Thus, in both the first embodiment and the second embodiment, the lean brake mechanism 50 is attached so as to protrude beyond the lean mechanism 42 in the upper-lower direction. Interference between the positions of the lean mechanism 42 and the lean brake mechanism 50 is less likely to occur.

The first embodiment and the second embodiment are different from each other in the shape of the rod attaching portion 25*b*. In the first embodiment, the lean brake mechanism 50 is positioned near the lower arm 44, and therefore the rod attaching portion 25*b* does not interfere with the lean brake mechanism 50. In the second embodiment, however, the lean brake mechanism 50 is positioned near the upper arm 43. Thus, a rod attaching portion 25*b* is shaped so as to bypass the lean brake mechanism 50. In the first embodiment, the positions of the upper arm 43 and the lower arm 44 are different in the front-rear direction, so that a space is produced, in which the steering rod 26 is disposed. In the second embodiment, on the other hand, the positions of the upper arm 43 and the lower arm 44 are the same in the front-rear direction. This is why the second steering part 25 is shaped to bypass the lean brake mechanism 50. To be specific, a part of the rod attaching portion 25*b* protrudes rearward (toward the side opposite to the lean brake mechanism 50), the part overlapping the lean brake mechanism 50 in a front view.

The upper arm 43 as well as the lower arm 44 rotates relative to the lean base 41 in the leaning operation. The lean brake can be operated as shown in FIG. 9, therefore. It should be noted that FIG. 9 shows a rear view, because the lean brake mechanism 50 of the second embodiment is attached on the rear surface side of the lean mechanism 42.

As thus far described, the leaning vehicle 1 according to any of the foregoing embodiments includes the vehicle body 2, the left front wheel 31L, the right front wheel 31R, the lean mechanism 42, and the lean brake mechanism 50. The left front wheel 31L is positioned on the first side (left side) in the vehicle width direction. The right front wheel 31R is positioned on the second side (right side) opposite to the first side in the vehicle width direction. The lean mechanism 42 causes the left front wheel 31L and the right front wheel 31R to lean about the front-rear direction as a rotation center when the vehicle body 2 leans about the front-rear direction as a rotation center. The lean brake mechanism 50 brakes the leaning operation of the lean mechanism 42. The lean mechanism 42 includes the upper arm 43, the lower arm 44, the left arm 45, and the right arm 46. The lower arm 44 is positioned more downward than the upper arm 43. The left arm 45 is attached to the left front wheel 31L, and is rotatably attached to the upper arm 43 and the lower arm 44. The right arm 46 is attached to the right front wheel 31R, and is rotatably attached to the upper arm 43 and the lower arm 44. The lean brake mechanism 50 includes the brake disc 51 and the brake pads 52b. The brake disc 51 is attached to the upper arm 43 or the lower arm 44. The brake pads 52b are attached such that their position relative to the brake disc 51 changes in the leaning operation, and produce a frictional force against the brake disc 51 in the leaning operation.

Although a space between the two front wheels is limited because of the need to avoid interference of the front wheel with another member in steering or in the leaning operation, effective use of the narrow space can be made since the brake disc 51 is attached to the upper arm 43 or the lower arm 44 in the above-described manner.

In the leaning vehicle 1 according to any of the foregoing embodiments, the brake disc 51 is one that is attached to the upper arm 43 or the lower arm 44. The brake pads 52b are the other that is attached such that the position thereof relative to the brake disc 51 changes in the leaning operation.

Since the brake pads 52b are operated by the brake caliper 52, a configuration surrounding the brake pads 52b tends to be complicated. In this respect, the brake pads 52b are attached to the upper arm 43 or the lower arm 44, and it therefore is possible that the position of the brake caliper 52 is settled without much consideration to interference of the brake caliper 52 with the upper arm 43 or the lower arm 44.

In the leaning vehicle 1 according to any of the foregoing embodiments, the lean brake mechanism 50 is positioned so as to overlap the center in the vehicle width direction.

Accordingly, the position at which the lean brake mechanism 50 is disposed can be distant from the front wheels, and can make the lean brake mechanism 50 less likely to interfere with the front wheels in steering or in the leaning operation.

In the leaning vehicle 1 according to any of the foregoing embodiments, the brake disc 51 is positioned so as to protrude above the upper arm 43 as illustrated in the second embodiment, or is positioned so as to protrude below the lower arm 44 as illustrated in the first embodiment.

Accordingly, the position at which the lean brake mechanism 50 is disposed can make the lean brake mechanism 50 less likely to interfere with the lean mechanism 42.

The leaning vehicle 1 according to any of the foregoing embodiments includes the steering rod 26 that, in response to receiving a rotational steering force, pushes and pulls the left front wheel 31L and the right front wheel 31R in the vehicle width direction, to change the actual steering angle. The steering rod 26 is positioned on the first side (on the front side in the first embodiment, and on the rear side in the second embodiment) of the lean mechanism 42 in the front-rear direction, and the brake disc 51 is positioned so as to protrude beyond the upper arm 43 or the lower arm 44 toward the first side in the front-rear direction.

This allows collective arrangement of the steering rod 26 and the lean brake mechanism 50, and thus can increase a space on the second side of the lean mechanism 42 in the front-rear direction.

In the leaning vehicle 1 according to any of the foregoing embodiments, the coefficient of friction beetweem the brake disc 51 and the brake pads 52b of the lean brake mechanism 50 is higher than the coefficient of friction produced by the front wheel brake mechanism for braking the left front wheel 31L or the right front wheel 31R.

The lean brake mechanism 50 has a relatively small size, and operates at a relatively low speed, and thus a high coefficient of friction is required. The above-described configuration can exert a sufficient function.

In the leaning vehicle 1 according to any of the foregoing embodiments, at least either one of the brake disc 51 or the brake pads 52b includes the base member 51a and the rubber sheets 51b. The rubber sheets 51b, which are attached to the base member 51a, have a rigidity lower than that of the base member 51a, and when the rubber sheets 51b are contacted, a higher coefficient of friction is obtained as compared to when the base member 51a is contacted.

Accordingly, the frictional force can be increased just by sticking the rubber sheets 51b to the base member 51a. In addition, a low rigidity of the rubber sheets 51b can be compensated for by the base member.

The leaning vehicle 1 according to any of the foregoing embodiments includes the lean base 41 and the lean bracket 49. The lean base 41 couples the lean mechanism 42 to the vehicle body 2. The lean bracket 49 is composed of a single member. The lean bracket 49 couples at least one of the upper arm 43 or the lower arm 44 to the lean base 41, and couples the brake pads 52b to the lean base 41.

This allows the lean bracket 49, which is a single member, to have two functions. Accordingly, the number of parts can be reduced.

While some preferred embodiments of the present invention have been described above, the configurations described above may be modified, for example, as follows.

Features of the first and second embodiments described above may be combined in appropriate manners. For example, the number of tubular suspensions, the lean mechanism 42, or the like, illustrated in the second embodiment may be applicable to the first embodiment. The same is true for other features.

In the various mechanisms described above, the shape of a component, the layout of a component, the structure for attaching a component, the structure for transmitting power, and the like, are just examples, and other configurations may be adoptable. For example, the left arm 45 does not always need to serve as a component for transmitting a steering force. A component different from the left arm 45 may serve as the component for transmitting a steering force.

Although the foregoing embodiments illustrate an example in which the present invention is applied to the leaning vehicle 1 having two front wheels and one rear wheel, the number of wheels is not limited to this. Two rear wheels may be acceptable. In addition, the number of persons who can ride on the leaning vehicle 1 is not limited to one or two. Three or more persons may ride.

REFERENCE SIGNS LIST 1 leaning vehicle
2 vehicle body
7 steering handle
10 suspension
23 first steering part
24 pantograph mechanism
25 second steering part
31L left front wheel (first front wheel)
31R right front wheel (second front wheel)
32L left wheel
32R right wheel
42 lean mechanism
50 lean brake mechanism

The invention claimed is:

1. A leaning vehicle, comprising:
a vehicle body;
a first front wheel positioned on a first side in a vehicle width direction;
a second front wheel positioned on a second side opposite to the first side in the vehicle width direction;
a lean mechanism configured to cause the first front wheel and the second front wheel to lean about a front-rear direction as a rotation center when the vehicle body leans about the front-rear direction as a rotation center; and
a lean brake mechanism configured to brake a leaning operation of the lean mechanism,
wherein the lean mechanism includes:
an upper arm,
a lower arm positioned more downward than the upper arm,
a first arm attached to the first front wheel and rotatably attached to the upper and lower arms, and
a second arm attached to the second front wheel and rotatably attached to the upper and lower arms,
wherein the lean brake mechanism includes:
a first brake member attached to the upper arm or the lower arm, and
a second brake member attached such that its position relative to the first brake member changes in the leaning operation, the second brake member being configured to produce a frictional force against the first brake member in the leaning operation,
wherein if the upper arm is attached to the first brake member, the upper arm includes a fulcrum portion at its longitudinal center, the fulcrum portion being rotatably attached to a side body portion of the vehicle body,
wherein if the lower arm is attached to the first brake member, the lower arm includes a fulcrum portion at its longitudinal center, the fulcrum portion being rotatably attached to the side body portion of the vehicle body, and
wherein, in a side view, the first and second front wheels overlap with the lean mechanism.

2. The leaning vehicle according to claim 1, wherein the first brake member is a brake disc and the second brake member is a brake pad.

3. The leaning vehicle according to claim 1, wherein the lean brake mechanism is positioned so as to overlap the center in the vehicle width direction.

4. The leaning vehicle according to claim 1, wherein the first brake member is positioned so as to protrude above the upper arm, or is positioned so as to protrude below the lower arm.

5. The leaning vehicle according to claim 1, further comprising:
a steering rod which, in response to receiving a rotational steering force, pushes and pulls the first front wheel and the second front wheel in the vehicle width direction, to change an actual steering angle,
wherein the steering rod is positioned on a first side of the lean mechanism in the front-rear direction and the first brake member is positioned so as to protrude beyond the upper arm or the lower arm toward the first side in the front-rear direction.

6. The leaning vehicle according to claim 1, wherein a coefficient of friction between the first brake member and the second brake member of the lean brake mechanism is higher than a coefficient of friction produced by a front wheel brake mechanism for braking the first front wheel or the second front wheel.

7. The leaning vehicle according to claim 6, wherein at least one of the first brake member or the second brake member includes:
a base member; and
a contact member attached to the base member, the contact member having a rigidity lower than that of the base member, the contact member being configured such that when the contact member is contacted, a higher coefficient of friction is obtained as compared to when the base member is contacted.

8. The leaning vehicle according to claim 1, further comprising:
a lean base coupling the lean mechanism to the vehicle body; and
a lean bracket composed of a single member,
wherein the lean bracket couples at least one of the upper arm or the lower arm to the lean base, and couples the second brake member to the lean base.

9. The leaning vehicle according to claim 1, wherein the upper arm is positioned at a higher position than an axle of the first and second front wheels and the lower arm is positioned at a lower position than the axle of the first and second front wheels.

10. The leaning vehicle according to claim 1, wherein each of the first arm and the second arm includes a knuckle member for changing an actual steering angle and a leaning member for leaning the leaning vehicle, the knuckle member and the leaning member being unified, wherein an upper end portion of the first arm and an upper end portion of the second arm are attached to the upper arm, and wherein a lower end portion of the first arm and a lower end portion of the second arm are attached to the lower arm.

11. A leaning vehicle, comprising:
a vehicle body;
a first front wheel positioned on a first side in a vehicle width direction;
a second front wheel positioned on a second side opposite to the first side in the vehicle width direction;
a lean mechanism configured to cause the first front wheel and the second front wheel to lean about a front-rear direction as a rotation center when the vehicle body leans about the front-rear direction as a rotation center; and a lean brake mechanism configured to brake a leaning operation of the lean mechanism,
wherein the lean mechanism includes:
  an upper arm,
  a lower arm positioned more downward than the upper arm,
  a first arm attached to the first front wheel and rotatably attached to the upper and lower arms, and
  a second arm attached to the second front wheel and rotatably attached to the upper and lower arms, and
wherein the lean brake mechanism includes:
  a first brake member attached to the upper arm or the lower arm, and
  a second brake member attached such that its position relative to the first brake member changes in the leaning operation, the second brake member being configured to produce a frictional force against the first brake member in the leaning operation, and
a steering rod positioned more downward than the upper arm and more upward than the lower arm.

* * * * *